United States Patent [19]
Crabtree

[11] Patent Number: 4,999,943
[45] Date of Patent: Mar. 19, 1991

[54] SEAT PEDESTAL LURE CONTAINER

[76] Inventor: Virgil H. Crabtree, Rte. 1, Flintville, Tenn. 37335

[21] Appl. No.: 487,764

[22] Filed: Mar. 2, 1990

[51] Int. Cl.$^5$ ............................................. A01K 97/00
[52] U.S. Cl. ....................................... 43/54.1; 43/57.1
[58] Field of Search ............................. 43/54.1, 57.1; 206/315.11, 315.1, 373

[56] References Cited

U.S. PATENT DOCUMENTS

| | | | |
|---|---|---|---|
| 899,466 | 9/1908 | O'Leary | 43/57.1 |
| 2,765,025 | 10/1956 | Bakalic et al. | 297/192 |
| 3,005,671 | 10/1961 | Majeski | 43/54.1 |
| 3,022,600 | 2/1962 | Glascoff | 43/57.1 |
| 3,378,134 | 4/1968 | Wilkinson | 43/54.1 |
| 3,947,991 | 4/1976 | Morcom | 43/54.1 |
| 4,697,379 | 10/1987 | McPhaul | 43/54.1 |
| 4,745,704 | 5/1988 | Schaefer | 43/54.1 |
| 4,765,470 | 8/1988 | Curci | 206/315.11 |

Primary Examiner—Richard K. Seidel
Assistant Examiner—Chuck Y. Mah

[57] ABSTRACT

A seat pedestal lure container for storage of fishing lures and other fishing gear in a safe and convenient location for the fisherman. The container has a hollow shaft which fits over the seat pedestal of a fishing boat; a bottom and top affixed to the hollow shaft; the bottom and top have a hole therein which aligns with the opening of the hollow shaft; the bottom and top of the container are connected by a housing which creates a chamber within the container; a tray caddy has a center opening designed to fit telescopically over the hollow shaft so that the tray caddy may be mounted within the chamber of the container; the center opening of the tray caddy is constructed to allow the tray caddy to rotate about the hollow shaft when the tray caddy is mounted within the container; the tray caddy has a number of trays oriented in a stack relationship and pivotally mounted on the periphery of the tray caddy so that they are free to rotate into the core of the tray caddy for storage or outside the core of the tray caddy for exposure and use by the fisherman; when the tray caddy is mounted within the chamber of the container, in order to rotate the trays outside the core of the tray caddy, the trays of the tray caddy must be aligned with an opening in the housing of the container.

17 Claims, 3 Drawing Sheets

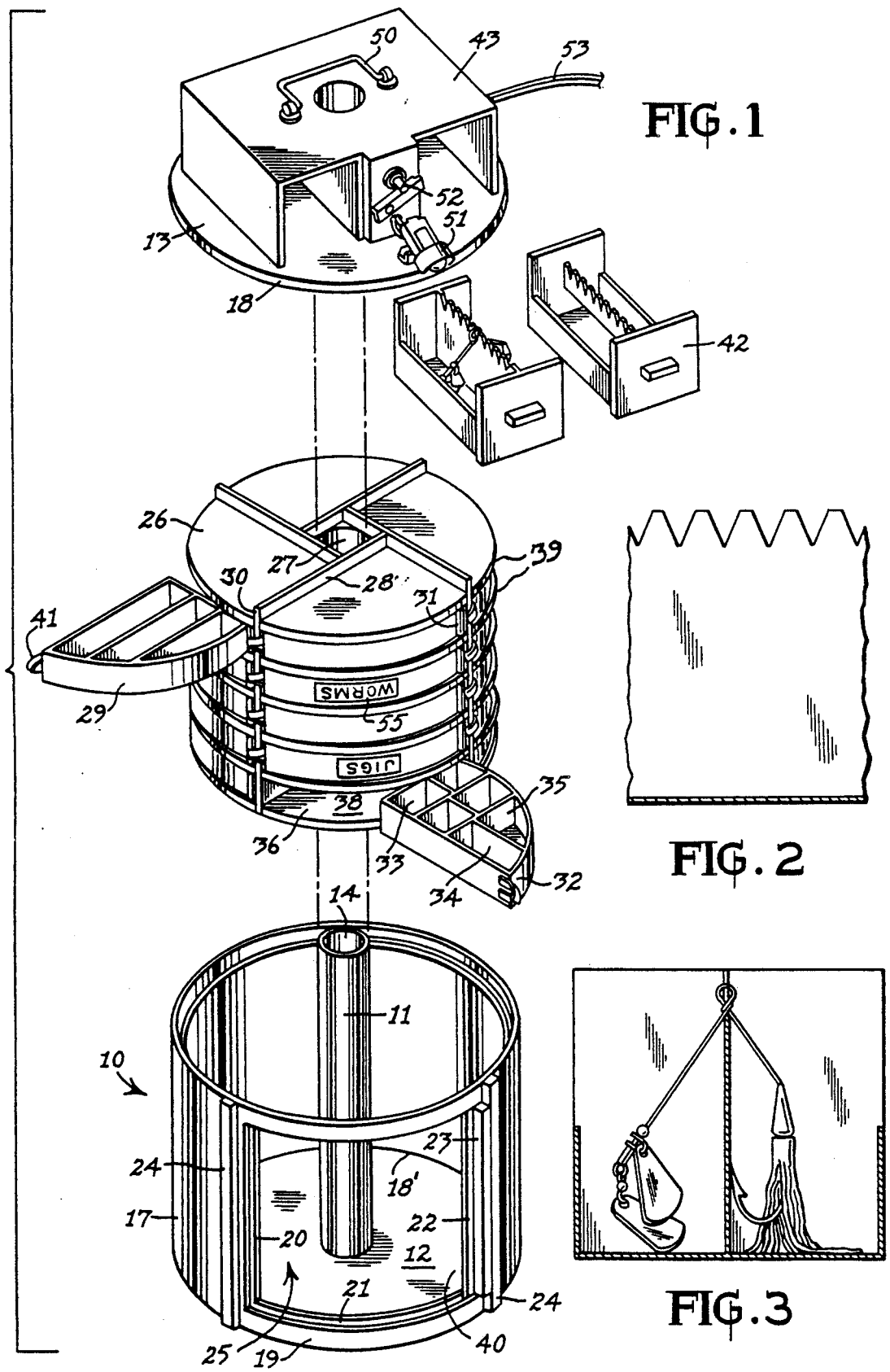

SEAT PEDESTAL LURE CONTAINER

BACKGROUND OF THE INVENTION

This invention relates to container devices generally and more specifically to a container which includes a number of compartments or trays which can be selectively accessed, and when access is not needed, the trays are stored in a fashion to prevent spillage of items contained within. Even more specifically, the container of this invention is designed to be mounted on the pedestal of a seat so that the user of the container may have the container directly beneath him and may rotate the container about his seat pedestal so as to position the container in a way to selectively access the trays housed within it.

The container of this invention is specially designed to be used by a fisherman and the description of this invention will be made in the context of its use by fishermen. As can be readily understood by those skilled in the container art, however, the use of this invention is not limited to fishermen but may find a variety of other uses by those who could take advantage of the features and the advantages of the present invention.

Considering the present invention in light of its particular usefulness to fishermen, the container of this invention is designed to allow a fisherman to have ready and easy access to his lures in a position and location which will not disturb his normal fishing routine, and which will selectively display the fishing lures to the fisherman while at the same time, sealing off trays within the container so that at any given time, only one stack of trays is exposed to the possibility of spillage. The container is portable and yet when installed in a proper fashion on a fishing boat, it is securely fixed within the fishing boat so as to avoid the loss of any valuable equipment.

PRIOR ART

Tackle boxes for fishing lures and fishing equipment are well known products with a wide commercial distribution. From the earlier fishing tackle boxes that had simply appeared to be tool boxes with hinged trays contained therein for exposure of two or three stacks of trays to more sophisticated modern tackle boxes that have a variety of compartments, inventors have strived to design a fishing tackle box that meets the many varied objectives of the fisherman. Multiple trays, multiple containers, various mounting structures for the trays and a variety of enclosures for protection against loss of fishing equipment have been attempted in the past. Two examples of more sophisticated fishing tackle containers are illustrated in the patents to Morcom, U.S. Pat. No. 3,947,991, and the patent to Majeski, U.S. Pat. No. 3,005,671. The inventions of these patents are directed toward multi-compartment stacked tray systems that offer certain advantages to fishermen but yet fail to meet other objectives of fishermen in terms of convenience, accessibility, protection against loss, durability and like.

The inventions of the foregoing patents, along with the disclosures of other patents in this field, clearly call the attention of one to the need for improvements in the manufacture and design of an improved tackle box. Morcom, for example, has a tackle box which has numerous stacked trays subject to selective exposure to the fisherman. However, in Morcom, the trays are not readily accessible to the fisherman because one cannot individually expose a single from a stack of trays. In addition, Morcom's trays are not exposed to the fisherman when rotated to the opened position of the container so that the fisherman can readily see the lures, make a selection and removal of lures, particularly from the trays that are in the top of his stack and therefore near the bottom of his seat. Looking, for example, at FIG. 7 of Morcom, the tackle box that he shows mounted beneath the seat of a fishing boat has no way of exposing the trays to the fisherman outside the shadow of the seat, thus, the fisherman would almost have to get up out of the seat and turn around and be able to look at the tackle box from a position away from the seat rather than being able to remain seated and make his selection from his fishing boat seat.

Majeski, on the other hand, fails to provide the ability to securely mount the tackle box on the fishing boat in a readily accessible position in order to protect against loss of fishing equipment.

The need has thus arisen for a fishing tackle container which provides for a number of stacked trays that can be selectively accessed by the fisherman, that can be accessed in a fashion so that they are readily visible to the fisherman, that can be stored in a manner to protect the fishing lures contained therein against loss or spillage; that can be mounted on a fishing boat seat pedestal and yet accessed in a way that a fisherman can clearly see the fishing lures when he opens the trays from the tackle box and that has other facilities such as the ability to provided additional trays, lights for night fishing, and the like.

SUMMARY OF THE INVENTION

In accordance with the present invention, a compartmentalized container is provided having a number of stacked trays that are pivotally mounted to the periphery of the container so that they may be rotated from the core of the container outwardly to expose the trays to the user. The trays are contained within a housing that has a top, bottom and sides that form a chamber and the trays are pivotally mounted on a tray caddie in a fashion to be rotated for storage to a position within the core of the caddy and rotated for use outside the core of the caddy and outside the chamber of the container. To facilitate the exposure of the caddy outside the chamber, an opening is provided in the housing of the container which opening may be closed off by a door that is slideably mounted within the housing.

The stacked trays may be divided by disks which help to stabilize the tray caddy and also provide a top and bottom for the trays themselves.

Generally, the present invention provides for more than one set of stacked trays, each set of trays mounted in the tray caddy radially from a center opening in the tray caddy and generally in an arcuate relationship with other sets of stacked trays.

The container has a hollow shaft mounted within it and which is of a shape and dimensions designed to fit telescopically over the pedestal the seat of a fishing boat. The container is pivotally mounted over the seat pedestal so that it may be rotated to a position such that the opening in the housing will be directly between the fisherman's legs. When the door is retracted into the housing, thus exposing the opening in the container, the tray caddy may be rotated about the hollow shaft so as to expose a stack of trays within the opening. Any one of the trays may then be selectively rotated about its pivotal mounting on the periphery of the tray caddy to expose the trays themselves. The trays are divided into compartments to contain the fishing tackle of the fisherman.

By virtue of this invention, the fisherman may remain seated as he decides to change his lures or otherwise rig his fishing gear to his satisfaction, while having the trays rotated outwardly so that they are clearly visible between his legs and not simply beneath the seat, thus allowing him to select the fishing tackle of his choice then to rotate the tray back within the core of the tray caddy. When so stored the disk creates a top for the tray to prevent any loss of fishing equipment. In addition, the tray caddy may be rotated within the chamber of the container about the hollow shaft to a degree less than necessary to expose the next stack of trays, thus binding the trays within the chamber so that they will not slide open as the boat might pitch or toss about in rough weather; all without the necessity of having to close the door and seal the opening of the container.

Having briefly summarize the invention, it is the purpose of the present invention to add to the pleasure of fishing by providing a fisherman a container which permits easy access to lures. It is the further purpose of this invention to eliminate the need to leave the trolling motor controls while changing lures that are stored in a fishing tackle box. It is a further purpose of the invention to provide a fishing tackle container that will allow fishing buddies to continue to fish while the operator of the boat is able to change his lure from his fishing tackle container. It is a further purpose of this invention to reduce the number of pre-rigged fishing devices by designing a container that will make available fishing lures at the fisherman's fingertips for a quick change.

It is a further objective of the invention to enhance fishing safety by replacing fishing boxes that must be kept open and expose a large variety of lures, hooks, equipment and the like. The present container is usually covered with the container sealed and not exposed during the course of the fishing experience. The present invention also has the feature of selectively exposing stacked trays within the container and allowing quick simple, single handed rotation of the inner tray caddy so it will seal off the trays and preventing any spillage of fishing tackle from the container.

DESCRIPTION OF THE DRAWINGS

For a more complete understanding of the present invention, and for further objects and advantages thereof, reference is now made to the following description taken in conjunction with the accompanying drawings in which:

FIG. 1 is an exploded view of the container of the present invention showing the various parts of the structure as they would be telescopically assembled;

FIGS. 2 and 3 show features of the trays on the top of the container that facilitate the storage of lures;

DESCRIPTION OF THE PREFERRED EMBODIMENT

Figure 13:
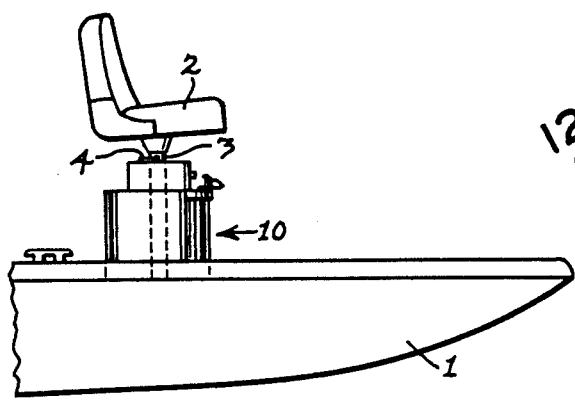
FIG. 13 shows the container of the present invention mounted on the pedestal of the seat of a fishing boat in accordance with the preferred embodiment of the invention.

Referring now to the figures of the drawings in which like characters reference like parts of the invention, the preferred embodiment of the invention is described as follows. As can be seen from FIGS. 1 and 13, the container which is the subject matter of this invention is a portable device designed to be mounted on the seat pedestal of a fishing boat. Referring first to FIG. 13, a fishing boat 1 is illustrated having a foremounted seat 2. The seat 2 is mounted to the boat 1 by means of a pedestal 3. The pedestal 3 is secured to the structure of the boat and extends upwardly so that the seat may be attached to the pedestal by any one of a number of known latching mechanisms 4. Normally, the seat 2 telescopes over the pedestal 3 and is then secured to the pedestal by the latching mechanism. Generally, the pedestal 3 is a pipe or other similar tube type structure and is a rigid fixed part of the boat. Seat 2 may be removed by releasing the latching mechanism and lifting the seat so as to expose the pedestal 3.

Figure 4:
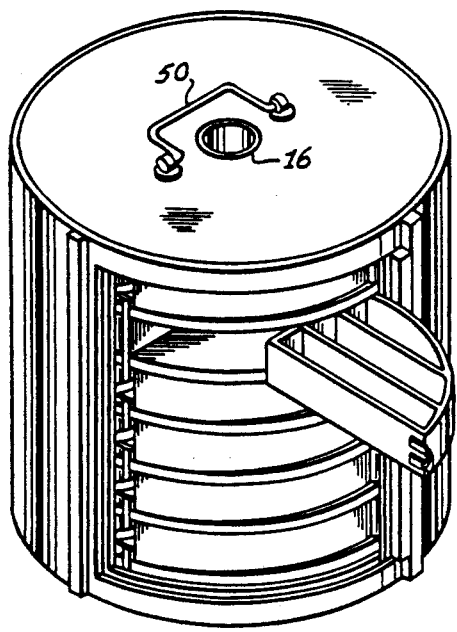
FIG. 4 shows the container assembled.
Figure 12:
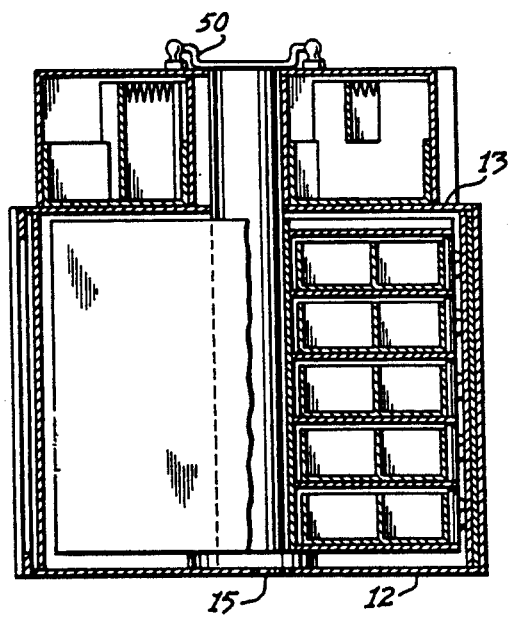
FIG. 12 shows a cross section of the invention along the lines 12—12 of FIG. 11.
Figure 10:
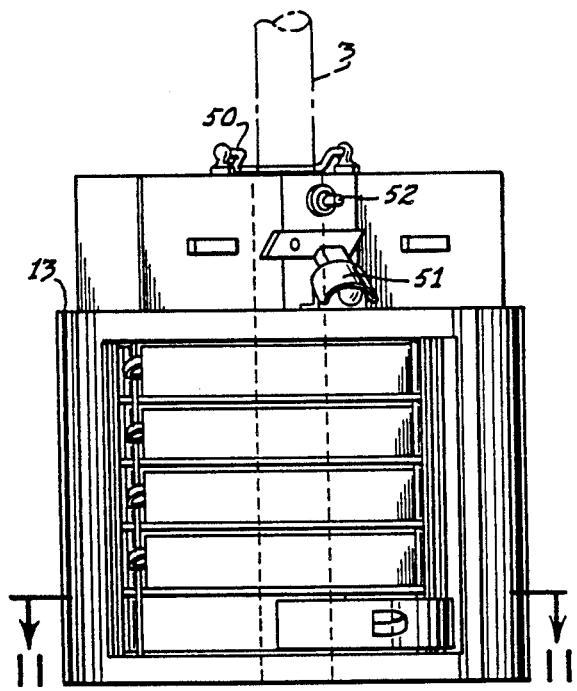
FIG. 10 shows a front view of the invention.

The container of this invention is generally referred to by reference character 10 and includes a hollow shaft 11 Which is of a size and shape designed to telescope over the pedestal 3 of the boat. Attached to the hollow shaft 11 is a bottom 12 and a top 13. The hollow shaft has an opening 14, and the bottom has an opening 15 (FIG. 12) concentric with the opening 14. Similarly, the top 13 has an opening 16 (FIG. 4) that is concentric with the opening 14 so that the pedestal 3 may pass through the opening in the center of the container when the container is lowered onto the pedestal 3 for mounting in the fishing boat. The seat 2 then can be reattached to the pedestal and securely affixed thereto by the latching mechanism 4.

The top 13 and the bottom 12 of the container are connected by a housing 17. In the preferred embodiment of the invention, the container is barrel shaped with the top 13 and the bottom 12 being circular and attached to the hollow shaft 11 so that the hollow shaft 11 forms an axis for the barrel shaped container. The hollow shaft 11, in its preferred embodiment is cylindrical, having a circular outer shape and circular opening 14 so that when mounted on the seat pedestal of a fishing boat, the container may freely rotate about the pedestal 3, if desired.

The housing 17 is attached to the peripheral edges 18 and 18' of the top and bottom of the container to create a chamber 25. In the preferred embodiment, the housing is a continuous piece of material, either a thin sheet of metal or plastic and formed in an arcuate shape to create the barrel type appearance of the container. It is not necessary, however, for the housing to be continuous, there my be openings within it or it could be created by vertical strips of material connecting the top and bottom of the container, or other similar structures.

Figure 5:
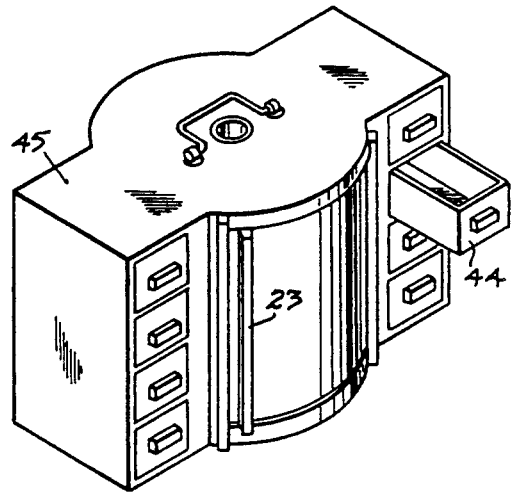
FIG. 5 shows a variation of the container with additional tray boxes integrated into the side walls of the container.
Figure 7:
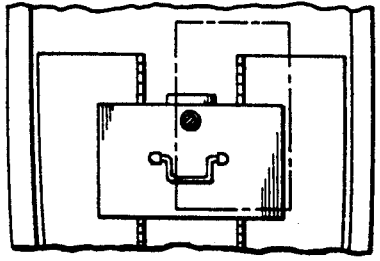
FIG. 7 is a top view of the embodiment of the invention as shown in FIG. 1.
Figure 6:
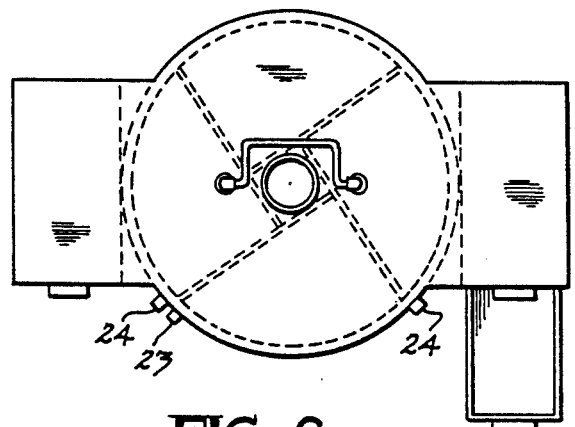
FIG. 6 is a top view of the modified fishing container as shown in FIG. 5.

At least a portion of the housing is a double wall structure having a wall 19 and a wall 20 spaced apart sufficient to form a small channel 21 in the housing. Slideably mounted within the channel 21 is a door 22 having a slide bar 23 attached to an outer portion thereof so that the user of the container may grip the slide bar to slide the door within the channel; thus the door may be either retracted within the housing as shown in FIG. 1 or slid to the closed position as shown in FIG. 5. Stops 24 are mounted on the outside of the housing so that the slide bar 23 will engage the stops as the door is slid from the open to the shut position and vice versa. Stops 24 prevent the door from sliding too far into the housing and thus becoming difficult to open or close.

Contained within the chamber 25 created by the assembly of the bottom 12, top 13, and housing 17 is a tray caddy 26. The tray caddy 26 has a center opening 27, which in its preferred embodiment is cylindrical but which may be other shapes so long as it is capable of telescoping over the hollow shaft 11 when the container is assembled. The tray caddy 26 is mounted in a manner to allow it to rotate about the hollow shaft 11.

The tray caddy 26 in its simplest form would include one or more dissecting members 28 which would be attached to a pipe having, or assembled to form, a center opening 27. The dissecting members 28 fit within the chamber 25 created by the bottom 12, top 13 and housing 17. Attached to the edge of the dissecting member fartherest from the center opening 27 would be one or more stacked trays 29 and generally a series of stacked trays 29 would be attached to the outermost edge of each of the dissecting members 28. The stacked trays 29 are pivotally connected to the outermost edge 30 of the dissecting members 28 by way of a number of readily available pivotal mounting structures 31. In one embodiment, the corner of each tray 29 has a sleeve 31 integrally formed therein or attached thereto. The sleeve 31 would pivot about a stem formed at or about the edge 30 of the dissecting member 28.

While shapes may vary, in the preferred embodiment, the shape of the trays 29 is the same for each tray, and each tray includes a perimeter wall 32 and one or more inner walls 33. The perimeter wall 32 is generally arcuate and conforms to the general shape of the inside of the housing 17 The tray may also be subdivided into compartments 34 by dividers 35.

Figure 11:
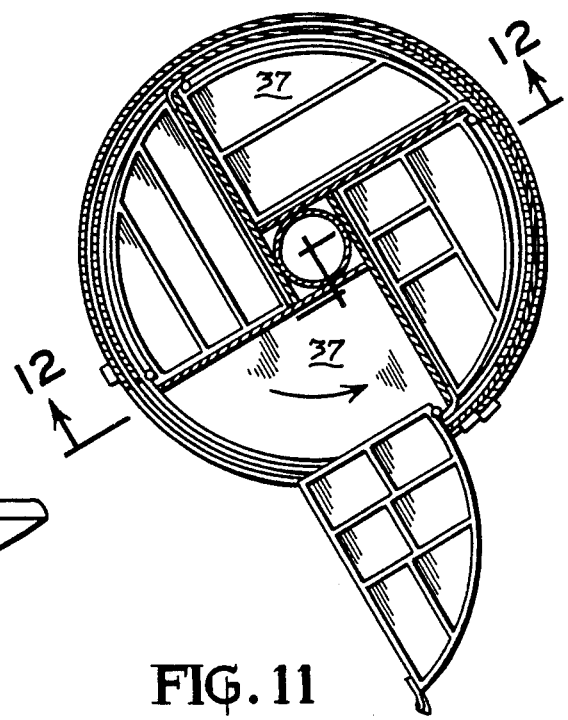
FIG. 11 shows a view along the lines 11—11 of FIG. 10.

When the tray caddy 26 is constructed of several dissecting members 28, such as shown in FIG. 1, the core 36 of the tray caddy 26 is divided into numerous core segments 37 (FIG. 11). The core segments may then be divided into pockets 38 by the spacing of disks 39 stacked axialy along the center opening 27 and connected to the dissecting members 28. The disks 39 are not in fact disks in the true sense of that term but are simply wedges or segments of disks but which give the appearance of disks when mounted to the dissecting members as shown in FIG. 1. The disks 39 form a stacked series of pockets 38 in which the stacked trays may be located when rotated in one direction about their pivotal mounting 31 and may be exposed for use by the fisherman when rotated in the other direction about their pivotal mounting 31.

When the container 10 is assembled, the tray caddy 26 is housed within the chamber 25 and when the door 22 is closed, the tray caddy is completely enclosed. In this configuration, the container may be carried from car to truck to boat and returned to the vehicle, stored at home, removed from home and carried as necessary for use on the fishing boat. The trays are completely encapsulated by the disks and the top, bottom and housing of the container so that there is no risk of loss of any of the fishing gear during transportation. When the fisherman arrives at the fishing boat, he simply removes the seat 2 from the pedestal 3, sets the container down over the pedestal with the pedestal 3 passing through the hollow shaft 11.

The fisherman can next rotate the container about the pedestal 3 so that the opening 40 is positioned between the fisherman's legs. The door 22 may then be slideably retracted into the channel 21 within the housing 17 so as to create the opening 40 and expose the tray caddy 26 to the fisherman. The tray caddy 26 may then be rotated until one stack of trays 29 are aligned with the opening 40. Any one of the trays within the stack may then be rotated about the pivotal connection 31 to rotate the tray out of the pocket 38 of core 36 to expose the tray and its various compartments to the fisherman. Because the tray is rotated outwardly from the container, the tray is readily available to the fisherman and even the trays that are closest to the top of the container and thereby closest to the bottom of the seat are fully exposed to the fisherman for his view, use and access. In order to rotate the trays outwardly from the core of the tray caddy, pull tabs 41 are contained on the end of each tray at a remote position from the pivotal connection 31 connecting the tray to the dissecting member 28. In addition, one or more of the trays may be labeled, and as shown in FIG. 1, the labels 55 should be "upside down" so that they can be read when the fisherman looks down between his legs from his seated position.

When the fisherman is finished using a particular tray, he may rotate it about the pivotal connection 31 back into the core 36 of the tray caddy 26 so that the tray is stored. The fisherman may then use another tray within that stack of trays by following the previously established procedure. If the fisherman desires to use a tray in a different stack of trays, he simply rotates the tray caddy 26 until the desired stack of trays is exposes to the opening 40. He may then rotate the desired tray about the pivotal connection 31 so that the tray is readily exposed to him. When he is finished, he again rotates the tray back into the core of the tray caddy for storage. If the fisherman wants to leave the door 22 opened or in the retracted position so as to create the opening 40 without closing the door after each use, he may do so. If he desires to assure that fishing lures and the like will not be tossed from the trays or otherwise displaced he can simply rotate the tray caddy a portion of a turn. In that position, the trays can not swing open because they are not properly located within the opening 40. When he again desires to use the trays, he simply rotates the tray caddy 26 back to the opening 40 so that the trays may be pivotally rotated out of the core and into a visual and usable position.

In the preferred embodiment of the invention as shown in FIG. 1, the tray caddy is also barrel shaped with the perimeter walls 32 of the each tray being arcuate in shape and the tray 29 being essentially pie shaped. Thus the maximum use of the trays is created. However, the trays could be other shapes and still take advantage of the teachings of the features of this invention.

Figure 8:
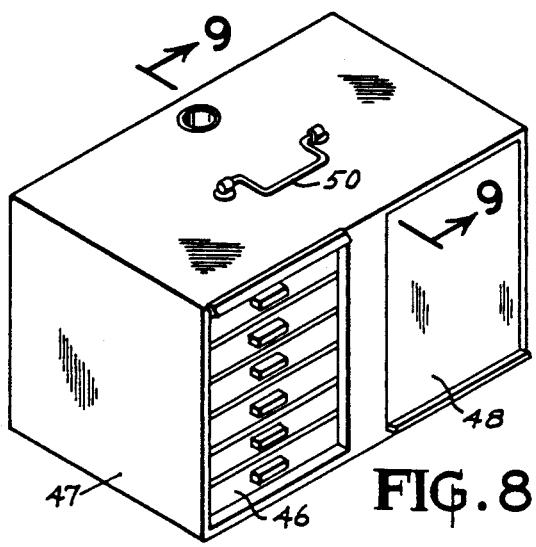
FIG. 8 is a perspective view of an alternative structure for the additional trays that are mounted on top of the container of FIG. 1.
Figure 9:
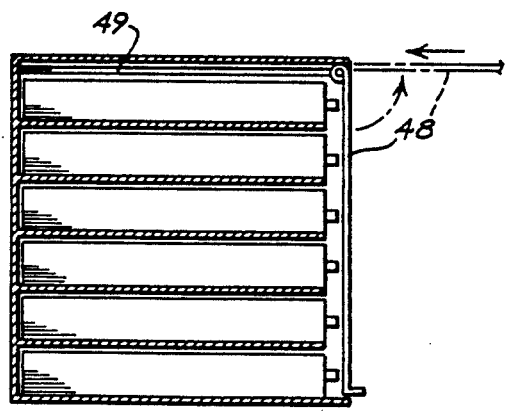
FIG. 9 is a section of the container taken along lines 9—9 of FIG. 8.

Other features of the invention include additional tray 42 which can be mounted in housing 43 on top of the container as well as trays 44 which can be mounted in the housing 45 in the variation of the invention as shown in FIG. 5. Another structure for trays to be mounted on top of the container is shown in FIG. 8 and includes trays 46 mounted within the housing 47. In addition, a retractable flap door 48 is shown FIG. 8 which would allow the user of the device to raise the trap door as shown in FIG. 9 and retract it within the slot 49 built within the housing 47 of this embodiment. In each embodiment of the invention, handle 50 is normally provided to facilitate transportation of the container. Other features of the invention include an electric light 51 which includes a switch 52 to turn the light off and on. The power source is provided for the light 51 by a line 53 connected to the battery on the fishing boat, thus allowing the fisherman to participate in night fishing and have easy access to his lures, being able to see them at night by switching on the light 51 by means of switch 52 and then switching the light off when he has completed his use of the tackle box.

FIGS. 2 and 3 show features of the trays 42 that are designed to use with different lures. These features are known in the industry but are illustrated simply for purposes of convenience.

Whereas the present invention has been described with respect to specific embodiments thereof, it will be understood that various changes and modifications will be suggested to one skilled in the art and is intended to encompass such changes and modifications as fall within the scope of the appended claims.

What is claimed is:

1. A compartmentalized container comprising:
   a. means forming a chamber,
   b. means forming a hollow shaft,
   c. the means forming the hollow shaft being within the chamber and connected to the means forming the chamber,
   d. an opening in the means forming the chamber thereby creating access to the chamber,
   e. tray caddy means for attachment of two or more trays thereto,
   f. said tray caddy means having pivot means for attachment of the trays to the tray caddy means,
   g. said pivot means being at or near the outer periphery of the said tray caddy means, and
   h. said tray caddy means with the trays attached thereto being mounted within the chamber in a manner which permits the tray caddy means to rotate about the means forming the hollow shaft.

2. The compartmentalized container claimed in claim 1 wherein the tray caddy means and the trays are assembled in relationship to the means forming the chamber so that when one or more of the trays are aligned with the opening in the means forming the chambers, the trays will be located outside the chamber when they are rotated in one direction about their pivotally attaching means and will be located inside the chamber when rotated in the other direction.

3. The compartmentalized container claimed in claim 1 wherein the two or more trays are in stacked configuration and pivotally mounted independently of each other.

4. The compartmentalized container claimed in claim 3 wherein there are two or more stacks of trays mounted on the tray caddy means.

5. The compartmentalized container claimed in claim 1 wherein the tray caddy means includes one or more pockets into which the trays are stored when they are located inside the chamber.

6. The compartmentalized container claimed in claim 1 wherein the means forming the chamber including two walls spaced in relation to each other to form a channel with a door slideably mounted in the channel so that when the door is slid in one direction it is retracted within the channel and the opening in the means forming the chamber is exposed, and when the door is slid in the other direction, it shuts off access to the chamber through the opening.

7. The compartmentalized container claimed in claim 6 wherein the door has a slide bar mounted thereon.

8. The compartmentalized container claimed in claim 6 wherein the chamber has stops mounted thereon.

9. The compartmentalized container claimed in claim 1 wherein the mean forming the chamber is arcuate in shape so that the container has a barrel type appearance.

10. The compartmentalized container claimed in claim 1 wherein the trays are divided into compartments.

11. The compartmentalized container claimed in claim 1 wherein the trays are pie shaped, having an outer wall that is arcuate and inner walls connected thereto.

12. The compartmentalized container claimed in claim 1 wherein the means forming the chamber has a top and mounted on the top is a housing with trays slideably mounted within the housing.

13. The compartmentalized container claimed in claim 12 wherein there is a light mounted on the top.

14. The compartmentalized container claimed in claim 1 wherein the means forming the chamber also form a housing on one or more sides of the chamber, with trays slideably mounted within the housing.

15. The compartmentalized container claimed in claim 1 wherein the trays are labeled, and the printing of the labels is oriented so that the top of the printing is adjacent to the bottom of the tray, giving the printing an upside down appearance when the container is upright and viewed from a standing position.

16. The compartmentalized container claimed in claim 1 wherein the means forming the hollow shaft are of a size and shape that the hollow shaft will telescopically fit over the pedestal of a fishing boat seat.

17. The compartmentalized container claimed in claim 1 wherein the hollow shaft is cylindrical.

* * * * *